United States Patent
Huang et al.

(10) Patent No.: US 10,873,435 B2
(45) Date of Patent: Dec. 22, 2020

(54) CONFIGURABLE INTRA-SLOT FREQUENCY HOPPING FOR A VARIABLE LENGTH UPLINK CONTROL CHANNEL

(71) Applicant: QUALCOMM Incorporated, San Diego, CA (US)

(72) Inventors: Yi Huang, San Diego, CA (US); Renqiu Wang, San Diego, CA (US); Hao Xu, Beijing (CN); Seyong Park, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 36 days.

(21) Appl. No.: 15/970,646

(22) Filed: May 3, 2018

(65) Prior Publication Data

US 2018/0323932 A1  Nov. 8, 2018

Related U.S. Application Data

(60) Provisional application No. 62/501,681, filed on May 4, 2017.

(51) Int. Cl.
*H04L 5/00* (2006.01)
*H04L 1/00* (2006.01)
(Continued)

(52) U.S. Cl.
CPC .......... *H04L 5/0051* (2013.01); *H04B 1/713* (2013.01); *H04L 1/005* (2013.01); *H04L 5/0012* (2013.01);
(Continued)

(58) Field of Classification Search
CPC ....... H04L 5/0051; H04L 1/005; H04L 5/001; H04L 5/0012; H04L 5/0028; H04B 1/713;
(Continued)

(56) References Cited

U.S. PATENT DOCUMENTS

2014/0179334 A1* 6/2014 Forenza ............... H04B 7/024
                                                    455/452.2
2016/0112994 A1* 4/2016 Wang ................... H04L 5/0048
                                                    370/329
(Continued)

OTHER PUBLICATIONS

LG (Configuration of long NR-PUCCH resource, 3GPP Draft; R1-1702482, Feb. 2017) (Year: 2017).*

(Continued)

*Primary Examiner* — Zhensheng Zhang
(74) *Attorney, Agent, or Firm* — Arent Fox, LLP

(57) ABSTRACT

The duration of variable length uplink control channels may vary over a wide range. Transmissions related to overhead may take up a larger percentage of symbols for shorter durations of the variable length uplink control channel. Disabling intra-slot hopping may be beneficial to decrease overhead (as a percentage). The apparatus may be an apparatus for wireless communication. The apparatus may include a transmitter or receiver and a processing system. The processing system may be configured to determine whether or not to use intra-slot frequency hopping for a variable length uplink control channel, and communicate information to the transmitter for transmission over the variable length uplink control channel or receive information from the receiver. The information may be received over the variable length uplink control channel, the information transmitted by the transmitter or received by the receiver based on the determination of whether or not to use intra-slot frequency hopping.

48 Claims, 13 Drawing Sheets

(51) Int. Cl.
*H04B 1/713* (2011.01)
*H04W 72/04* (2009.01)
*H04W 72/12* (2009.01)
*H04W 72/14* (2009.01)

(52) U.S. Cl.
CPC ......... *H04W 72/0413* (2013.01); *H04L 5/001* (2013.01); *H04L 5/0028* (2013.01); *H04W 72/1284* (2013.01); *H04W 72/14* (2013.01)

(58) Field of Classification Search
CPC ......... H04W 72/0413; H04W 72/1284; H04W 72/14
See application file for complete search history.

(56) References Cited

U.S. PATENT DOCUMENTS

2019/0109732 A1\* 4/2019 Choi .................. H04L 25/0226
2020/0059332 A1\* 2/2020 Takeda ................. H04L 5/0012

OTHER PUBLICATIONS

Intel Corporation: "Long PUCCH Design Aspects", 3GPP Draft; R1-1705031 Intel Long PUCCH Design, 3rd Generation Partnership Project (3GPP), Mobile Competence Centre, 650, Route Des Lucioles, F-06921 Sophia-Antipolis Cedex, France, vol. RAN WG1, No. Spokane. USA; Apr. 3, 2017-Apr. 7, 2017 Mar. 25, 2017, XP051251706, Retrieved from the Internet: URL:http://www.3gpp.org/ftp/tsg_ran/WG1_RL1/TSGR1_88b/Docs/ [retrieved on Mar. 25, 2017], Sections 1. 2.1.3, 5 pages.
International Search Report and Written Opinion—PCT/US2018/031156—ISA/EPO—dated Sep. 17, 2018.

\* cited by examiner

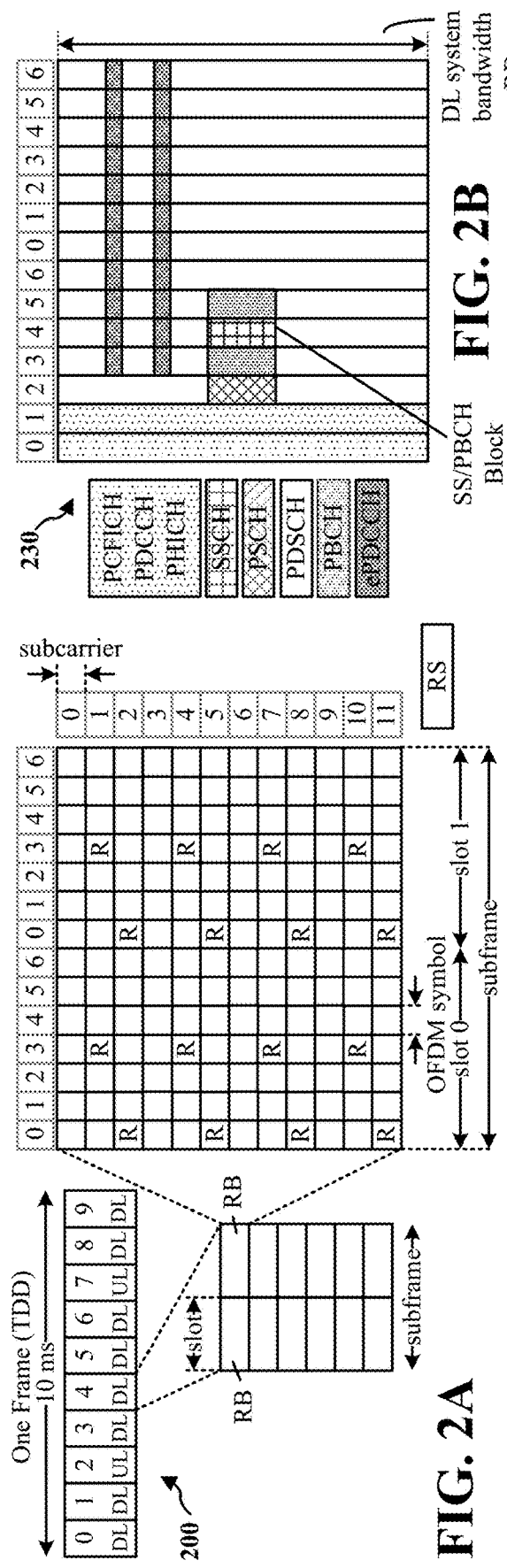
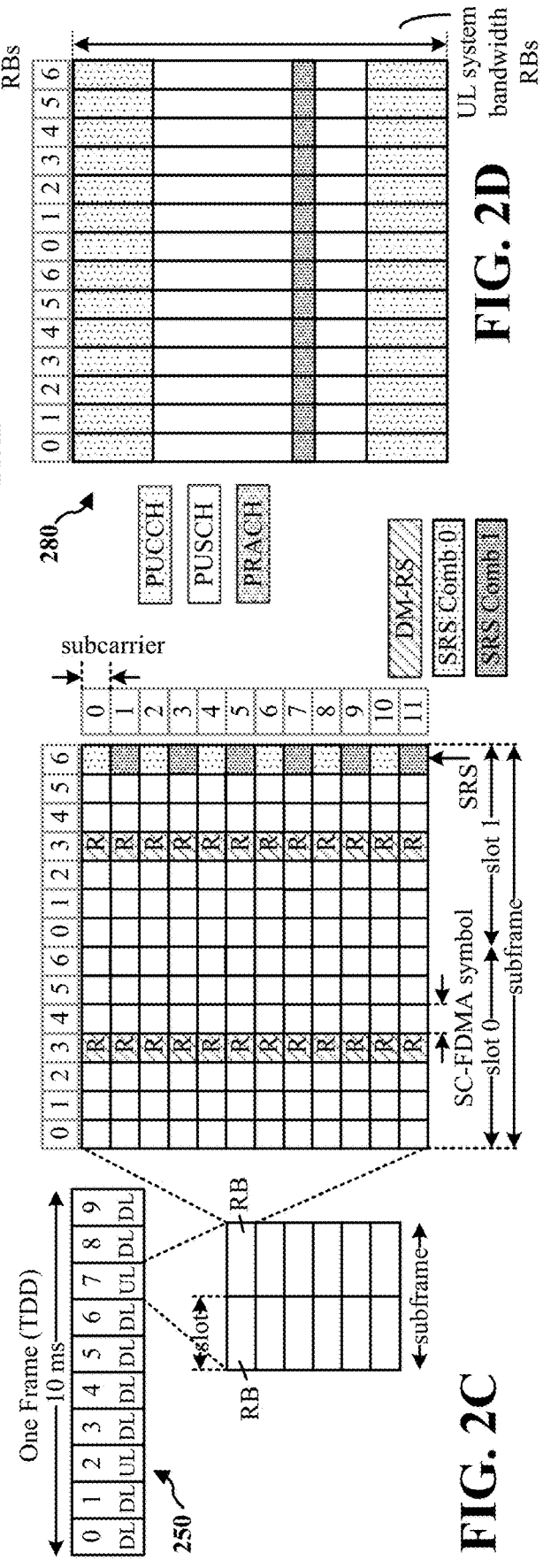

CONFIGURABLE INTRA-SLOT FREQUENCY HOPPING FOR A VARIABLE LENGTH UPLINK CONTROL CHANNEL

CROSS-REFERENCE TO RELATED APPLICATION(S)

This application claims the benefit of U.S. Provisional Application Ser. No. 62/501,681, entitled "CONFIGURABLE INTRA-SLOT FREQUENCY HOPPING FOR A VARIABLE LENGTH UPLINK CONTROL CHANNEL" and filed on May 4, 2017, which is expressly incorporated by reference herein in its entirety.

BACKGROUND

Technical Field

The present disclosure relates generally to communication systems, and more particularly, to an uplink control channels in a communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. Such improvements may also be applicable to other multi-access technologies and the telecommunication standards that employ such technologies.

5G NR may include a short physical uplink control channel (PUCCH) and a long PUCCH. In some aspects, the duration of the long PUCCH, e.g., in the number of symbols, may vary over a wide range. Demodulation reference signal (DMRS) overhead may take up a larger percentage of the symbols for shorter durations of the long PUCCH as compared to longer durations of the long PUCCH. Accordingly, disabling intra-slot hopping may be beneficial to decrease DMRS overhead, particularly for shorter durations of the long PUCCH.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Variable length uplink control channels such as a PUCCH may vary in length over a wide range, e.g., the variable length uplink control channels may have a variable number of symbols. Overhead may use a number of symbols, e.g., 2 symbols, per variable length uplink control channel. Accordingly, variable length uplink control channels having 4 symbols may only have 2 symbols (e.g., 50% of the symbols) available for data while a long PUCCH having 14 symbols may have 12 symbols (e.g., approximately 86%) available for a data. Accordingly, disabling intra-slot hopping may be beneficial to decrease overhead, particularly for shorter variable length uplink control channels. For shorter variable length uplink control channels, the benefits of intra-slot frequency hopping may not outweigh the overhead cost which may result in a low percentage of symbols available for data. Conversely, longer variable length uplink control channels, with higher percentages of symbols available for data may use intra-slot frequency hopping to, for example, increase the reliability of the PUCCH transmissions.

For example, as discussed above, 5G NR includes a short duration PUCCH and a long duration PUCCH. In some aspects, the duration of the long PUCCH, e.g., as measured in the number of symbols, may vary over a wide range. For example, the duration of a long PUCCH in the number of symbols, may be: 4 symbols, 5 symbols, 6 symbols, 7 symbols, 8 symbols, 9 symbols, 10 symbols, 11 symbols, 12 symbols, 13 symbols, 14 symbols, or some other number of symbols. DMRS overhead may take up a larger percentage of symbols for the shorter durations of the long PUCCH, e.g., as compared to the longer durations of the long PUCCH. For example, DMRS overhead may use 2 symbols per long PUCCH. Accordingly, a long PUCCH having 4 symbols may only have 2 symbols (e.g., 50% of the symbols) available for data intended to be transmitted over the PUCCH, while a long PUCCH having 14 symbols may have 12 symbols (e.g., approximately 86%) available for data intended to be transmitted over the PUCCH. Disabling intra-slot hopping may be beneficial to decrease DMRS overhead as a percentage of the number of symbols.

In an aspect of the disclosure, a method, a computer-readable medium, and an apparatus are provided. The apparatus may be an apparatus for wireless communication. The apparatus may include a transmitter and a processing system. The processing system may be configured to determine whether or not to use intra-slot frequency hopping for a variable length uplink control channel, and communicate information to the transmitter for transmission over the variable length uplink control channel, the information transmitted by the transmitter based on the determination of whether or not to use intra-slot frequency hopping.

In an aspect of the disclosure, a method, a computer-readable medium, and an apparatus are provided. The apparatus may be an apparatus for wireless communication. The apparatus may include a receiver configured to receive information over a variable length uplink control channel and a processing system. The processing system may be configured to determine whether or not to use intra-slot frequency hopping for a variable length uplink control channel, and receive the information from the receiver based on the determination of whether or not to use intra-slot frequency hopping.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

DETAILED DESCRIPTION

Figure 1:
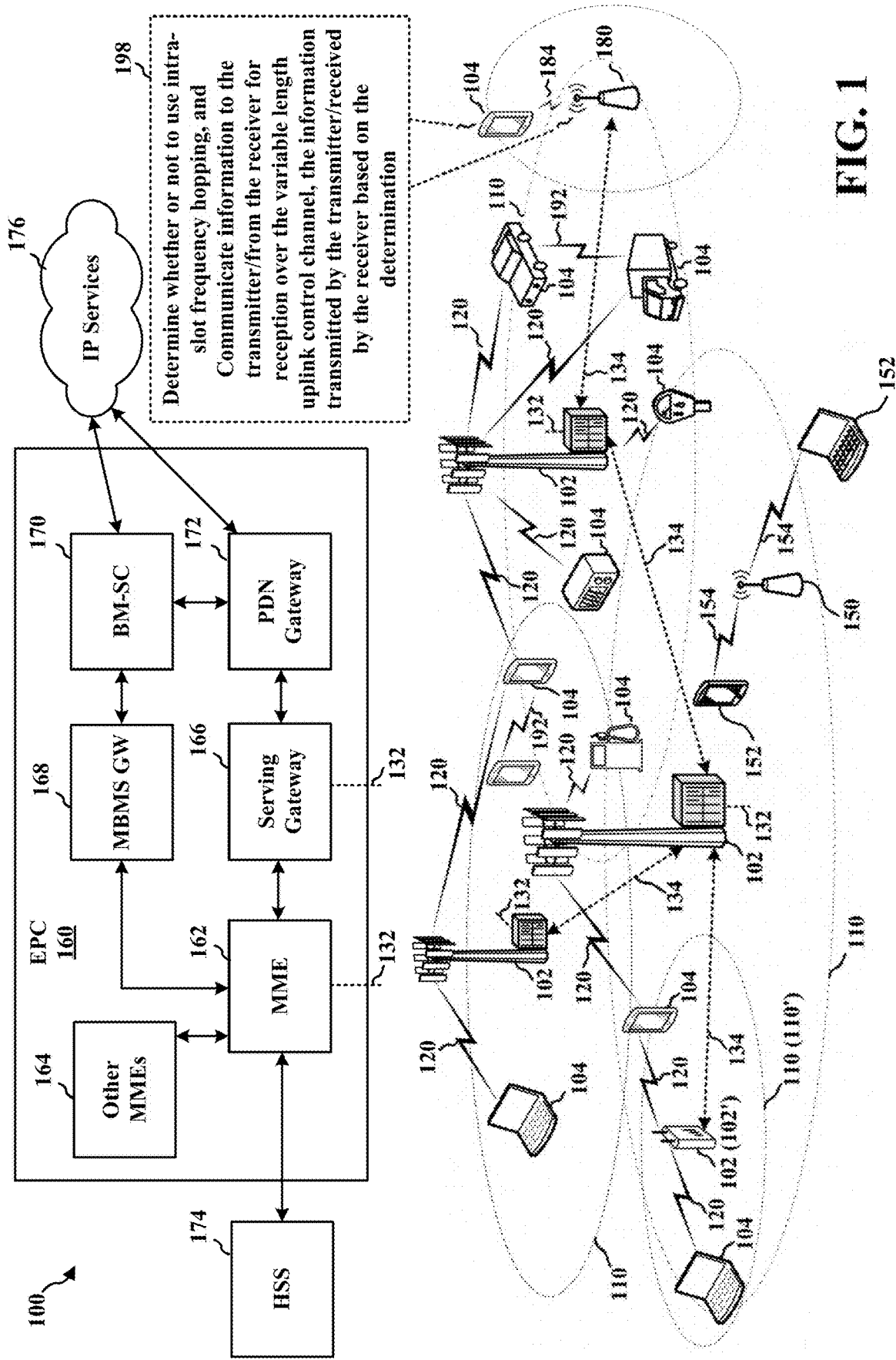
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or base station 180 may each be configured to determine whether or not to use intra-slot frequency hopping for a variable length uplink control channel, and communicate information to the transmitter for transmission over the variable length uplink control channel (e.g., UE 104) or receive information received by the receiver over the variable length uplink control channel (e.g., base station 180), the information transmitted by the transmitter (e.g., in the UE 104) or received by the receiver (e.g., in base station 180) based on the determination of whether or not to use intra-slot frequency hopping (198).

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to V*15 kKz, where μ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
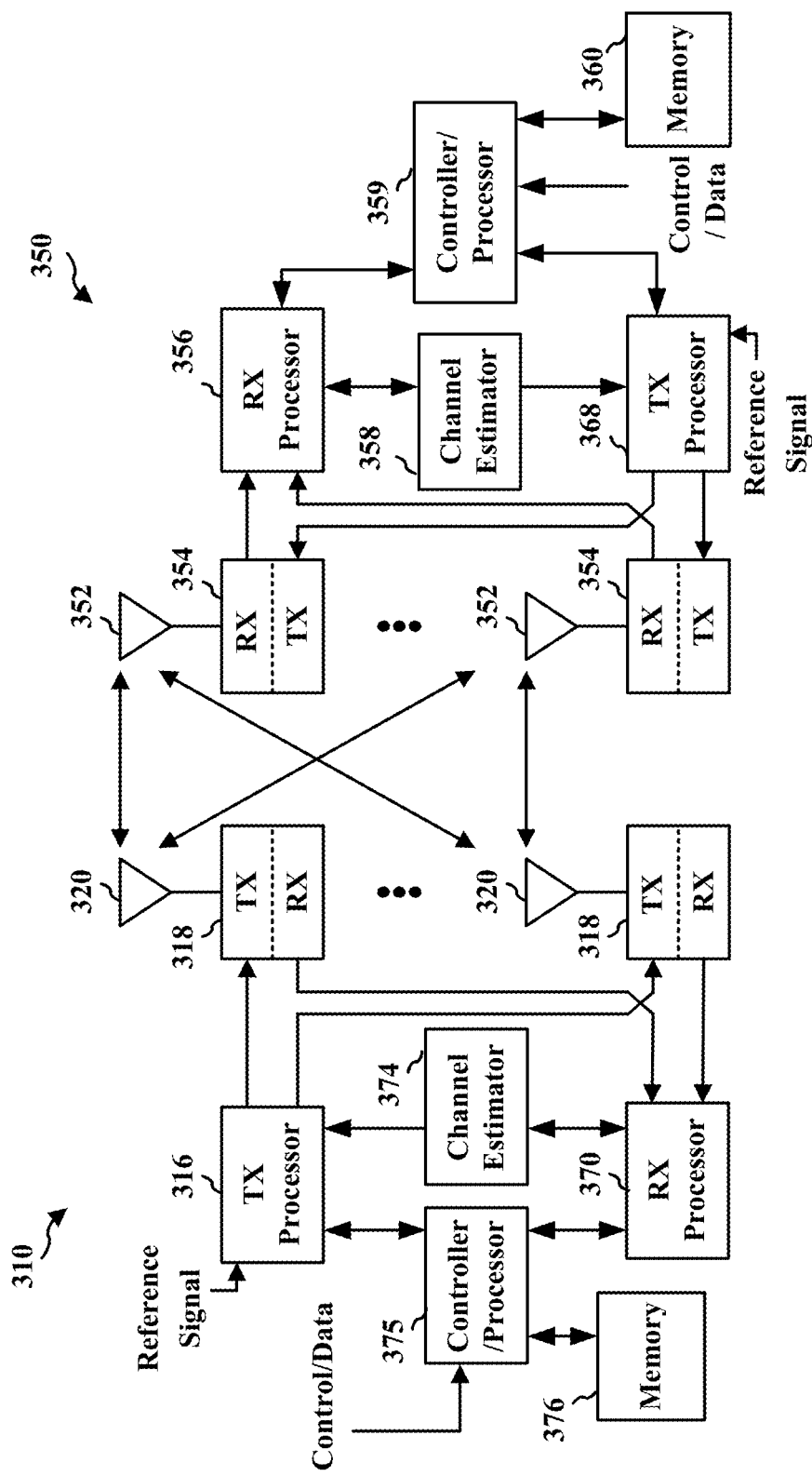
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
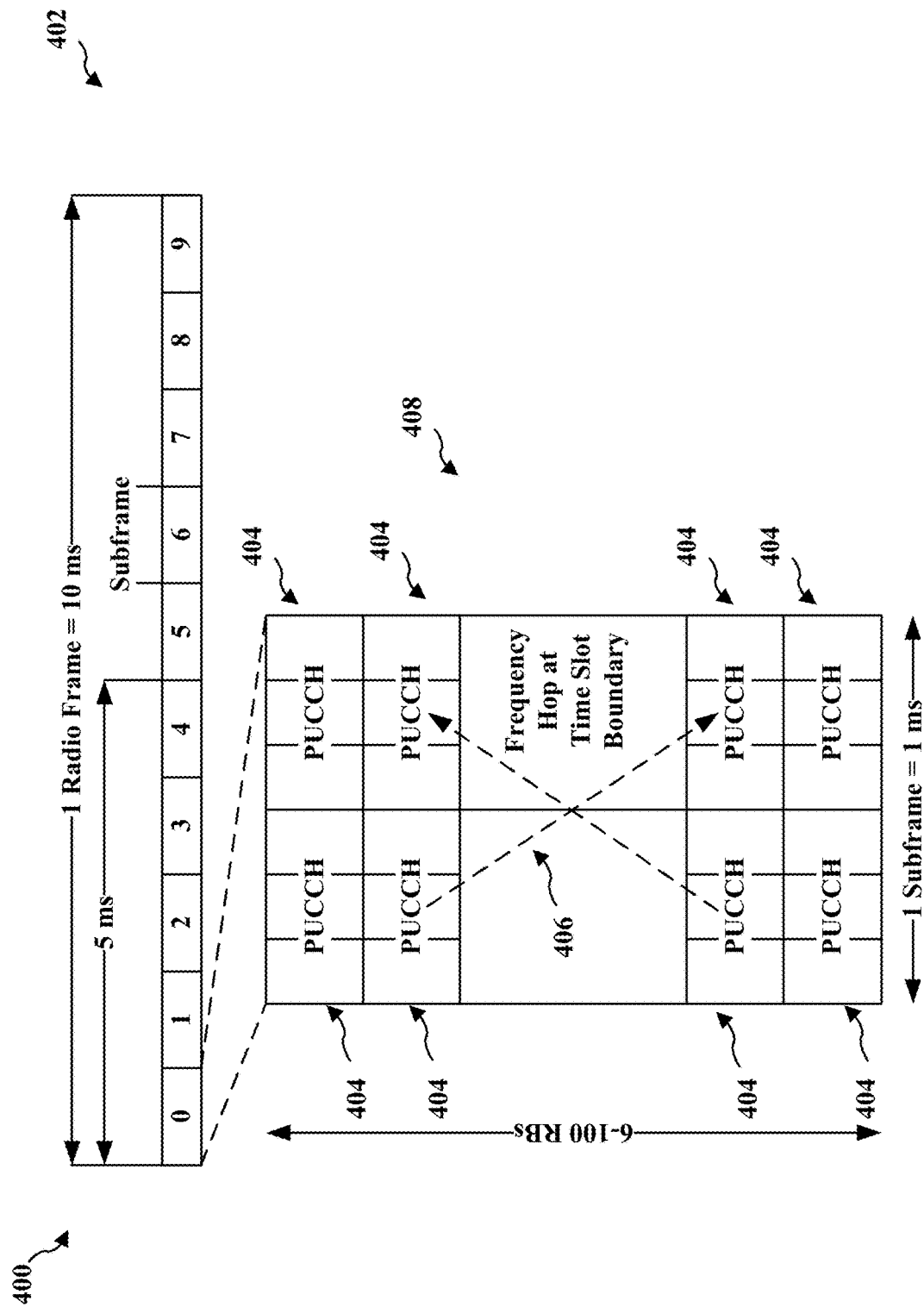
FIG. 4 is a diagram illustrating intra-slot hopping in LTE communications system.

FIG. 4 is a diagram 400 illustrating intra-slot hopping in LTE communications system. The diagram 400 includes an example radio frame 402. The example radio frame 402 includes 10 sub-frames numbered 0 to 9. Each of the sub-frames may be 1 ms in length. Furthermore, the radio frame may be broken into two 5 ms portions, e.g., 5 sub-frames in each portion.

As illustrated in FIG. 4, a subframe may be broken into a series of time/frequency blocks (e.g., resource blocks 404) that may be used for transmission of information. For example, subframe 0 of the example radio frame 402 may be broken into a series of time/frequency blocks 408 (e.g., resource blocks 404). The series of time/frequency blocks 408 may include two sets of between 6 and 100 RBs in some examples. A PUCCH may be assigned to one or more time/frequency blocks (resource blocks 404) and may be used to transmit Physical Uplink Control Channel information. Other time/frequency blocks (resource blocks 404) may also be used to transmit user data. For example, the resource blocks 404 that are not used to transmit a PUCCH may be used to transmit user data or other types of data, such as other control information in other control channels. (Other subframes may be similarly broken into a series of time/frequency blocks 408 (e.g., resource blocks 404).)

With intra-slot frequency hopping, a control channel, e.g., PUCCH, may frequency hop or change frequencies, within a subframe across a time slot boundary. As indicated by the arrows 406 between different time/frequency blocks (resource blocks 404), intra-slot frequency hopping may be used in LTE (or 5G/NR, or other wireless standards) to provide frequency diversity. Accordingly, a PUCCH may be moved from one frequency to another frequency, e.g., hopping. In the illustrated example, multiple PUCCHs may be transmitted. Each of the multiple PUCCHs may change frequency every 0.5 ms. For example, for a subframe that is 1 ms, PUCCH frequency hopping may occur every 0.5 ms as indicated by arrows 406.

When intra-slot frequency hopping is enabled, a UE may break a whole PUCCH duration, say Z symbols, into two parts where the first part includes Z1 symbols and the second part includes Z2 symbols. (For intra-slot frequency hopping, Z1+Z2 may equal a total number of symbols in the whole PUCCH, Z) The first part of PUCCH may be send on a first set of RBs. The second part of PUCCH may be send on a second set of RBs. The first set of RBs and the second set of RBs are different.

Figure 5:
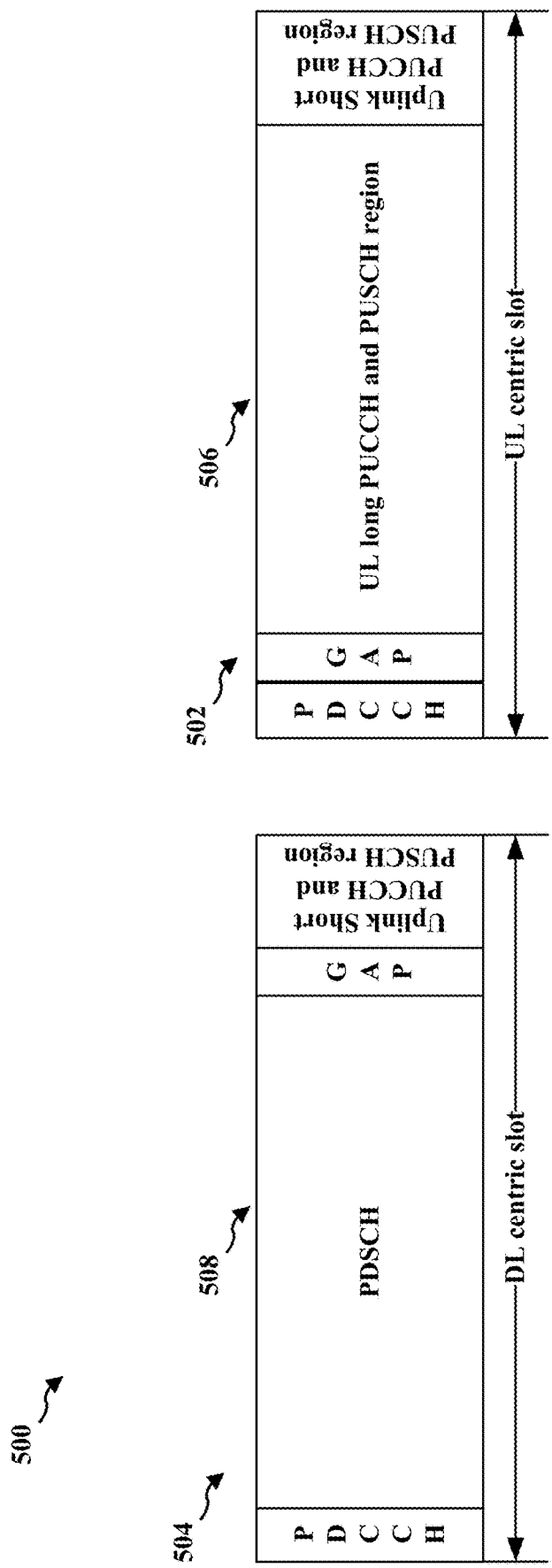
FIG. 5 is a diagram illustrating long PUCCH and short PUCCH in 5G NR.

FIG. 5 is a diagram 500 illustrating an uplink centric slot 502 and a downlink centric slot 504 in 5G NR. The example of FIG. 5 is specific to a PUCCH, however, the systems and methods described herein may be applied to any variable length uplink control channel where frequency hopping may be allowed. In such an example, the frequency hopping may be turned on and off based on various circumstances such as those described herein, e.g., number of symbols available, channel conditions, need for efficiency in the use of symbols or lack thereof, or other factors that may impact the utility of frequency hopping. As illustrated in FIG. 5, a downlink centric slot 504 may include a PDCCH, a PDSCH, a gap in time, and an uplink short PUCCH and PUSCH region. The gap in time may allow a UE time to switch from downlink to uplink or from uplink to downlink. An uplink centric slot 502 may also include a PDCCH, a GAP, an UL long PUCCH and PUSCH region, and an uplink short PUCCH and PUSCH region. The techniques described herein may decrease DMRS overhead, particularly for shorter durations of the long PUCCH. In some examples, both intra-slot and inter-slot frequency hopping provides "frequency diversity."

When a PUCCH in either of two sets of RBs are jammed due to another cell's interference, there is another set of RBs. A base station may try to decode a PUCCH from the other set of RBs.

In the downlink centric slot 504, an area between the PDCCH and GAP may include the PDSCH 508. In the uplink centric slot 502, an area between the GAP and the uplink short PUCCH and a PUSCH region may include an uplink long PUCCH and PUSCH region 506. In an example, the PUSCH region 506 may include time/frequency resources that may be used to transmit or receive symbols used for the PUCCH. The time/frequency resources in the PUSCH region 506 may include, for example, a long PUCCH that may have a duration of 4 to 14 symbols wide. The long PUCCH may be located anywhere within the time/frequency resources of the PUSCH region 506.

In an aspect, variable length uplink control channel intra-slot frequency hopping, such as long PUCCH intra-slot hopping, may be disabled. For example, in 5G NR, there are long PUCCH and short PUCCH. In 5G NR, because the duration of a long PUCCH, e.g., in number of symbols, may have a wide range, such as, 4 to 14 symbols wide, it may be advantageous to disable intra-slot hopping for certain long PUCCH. Factors such as number of symbols available for each PUCCH, channel conditions, a need for efficiency in the use of symbols, a lack of a need for efficiency in the use of symbols, or other factors may be used to determine when hopping should be used or not used.

As discussed above, for certain scenarios, it may be beneficial to disable intra-slot hopping. For example, when a long PUCCH duration is only 4 symbols, a system may disable hopping to reduce DMRS overhead. Some systems may disable or enable intra-slot long PUCCH hopping based on channel conditions. For example, when one or more frequencies include a large amount of noise, enabling frequency hopping may be more advantageous. Accordingly, the factors of number of symbols available for each PUCCH, channel conditions, a need for efficiency in the use of symbols, a lack of a need for efficiency in the use of symbols, or other factors may be used to determine when to use and when not to use frequency hopping. For example, when a total number of symbols available for PUCCH is used to determine when to use or not to use frequency hopping, the threshold of total number of symbols available for PUCCH may be adjusted up or down based on a total number of symbols, e.g., the length of the PUCCH channel; channel conditions, e.g., uplink channel conditions based on uplink signal-to-noise ratio (SNR) and/or downlink sounding reference signal (SRS), for example; one or more of the other factors.

In an aspect, a UE or a base station may implicitly disable or enable intra-slot long PUCCH hopping based on PUCCH duration and/or the other factors described herein. For example, a number of symbols, e.g., 4 to 14 symbols, may be selected to indicate enabling or disabling variable length uplink control channel intra-slot frequency hopping. When a variable length uplink control channel is greater than or equal to a predetermined number of symbols (e.g., one of 4, 5, 6, 7, 8, 9, 10, 11, 12, 13, or 14 symbols wide) variable length uplink control channel intra-slot frequency hopping may be used, while when the variable length uplink control channel is less than the predetermined number of symbols, may not be used. Thus, it may be advantageous to use hopping only for cases when a higher percentage of symbols are available for data transmission or data reception. (The example used 4 to 14 symbols, however, some other number of symbols may be used for communications systems having a different number of symbols in a variable length uplink control channel such as a PUCCH.) The number of symbols selected may be variable, e.g., based on a total number of symbols, e.g., the length of the PUCCH channel; channel conditions, e.g., uplink channel conditions based on uplink signal-to-noise ratio (SNR) and/or downlink sounding reference signal (SRS), for example; other factors. For example, a base station may signal the number of symbols selected, e.g., using DCI or RRC signaling.

As discussed above, the duration of a long PUCCH (or other variable length uplink control channel) in the number of symbols, may be: 4 to 14 symbols, or some other number of symbols. Overhead may take up a larger percentage of symbols for the shorter durations of the long PUCCH, e.g., as compared to the longer durations of the long PUCCH. For example, overhead may use 2 symbols per long PUCCH. Accordingly, a long PUCCH (or other variable length uplink control channel) having 4 symbols may only have 2 symbols (e.g., 50%) available for a data intended to be transmitted over the PUCCH while a long PUCCH having 14 symbols may have 12 symbols (e.g., approximately 86%) available for a data intended to be transmitted over the PUCCH. The selected number of symbols may correspond to having between 50% and 86% available for the transmission of data over a PUCCH (variable length uplink control channel). Disabling intra-slot hopping may be beneficial to decrease overhead, such as DMRS overhead (e.g., overhead as a percentage of the number of symbols in the PUCCH or variable length uplink control channel).

As discussed above, 5G NR may include a short PUCCH and a long PUCCH. In some aspects, the duration of the long PUCCH, e.g., in the number of symbols, may vary over a wide range. DMRS overhead may take up a larger percentage of the symbols for shorter durations of the long PUCCH as compared to longer durations of the long PUCCH. Accordingly, disabling intra-slot hopping may be beneficial to decrease DMRS overhead, particularly for shorter durations of the long PUCCH. For example, intra-slot frequency hopping may break a total number of symbols in a PUCCH into two parts. For example, when a PUCCH has 10 symbols, that PUCCH may be broken into two parts having 5 symbols each. One part may be sent on a first frequency and the other part may be sent on another frequency. Each part may have at least one DMRS symbol so that channel estimation may be performed on each of the two frequencies. (If only one symbol is used, e.g., in the first part, then channel estimation cannot be performed on the second part.) When frequency hopping is not used, then a single DMRS symbol may be used for the entire PUCCH, e.g., because the PUCCH is transmitted in a single frequency. Thus, DMRS overhead may be decreased when frequency hopping is not used.

Examples of DMRS overhead are provided in Table 1, below. DMRS overhead may be based on a number of DMRS symbols per total number of symbols for the PUCCH. For example, one implementation may use one DMRS symbol per PUCCH. Other examples may use other (2, 3, etc.) numbers of DMRS symbols per PUCCH. For example, Table 1 uses two symbols. Accordingly, when the PUCCH is four, the percentage of symbols available for data transmission is 50%. See Table 1 for additional examples.

Table 1, below, provides percentages of symbols available for data transmission over a variable length uplink control channel assuming two symbols are used for overhead.

TABLE 1

| Total number of symbols for PUCCH | Percentage of symbols available for data transmission |
| --- | --- |
| 4 | 50% |
| 5 | 60% |
| 6 | 67.7% |
| 7 | 71.4% |
| 8 | 75% |
| 9 | 77.8% |
| 10 | 80% |
| 11 | 81.8 |
| 12 | 83.3% |
| 13 | 84.6% |
| 14 | 85.7% |

The percentage of symbols available for data transmission that is acceptable may vary from implementation to implementation. The total number of symbols selected as a threshold for enabling and disabling, for example, intra-slot PUCCH frequency hopping, may vary from, for example, 4 to 14. Furthermore, the threshold selected may be variable based on other factors, as described herein. In other examples, the number of symbols selected may be fixed for a particular implementation. For example, in one implementation the threshold may be equal to 4. In another example, the threshold may be equal to 7. The number of symbols for the threshold may be selected to attain a desired percentage of symbols available for data transmission in, for example a PUCCH. Thus, for example, when a percentage such as 80% is selected, for any number of slots in a PUCCH less than 10, intra-slot PUCCH frequency hopping should not be used. For PUCCH having 10 or more symbols, intra-slot PUCCH frequency hopping may be used.

In a first aspect, the threshold may be predetermined. Accordingly, each device in such a system may use a known threshold to determine if frequency hopping is used. Thus, no signaling is needed to transmit the threshold because the threshold is already known to each device in the system. Different thresholds may be used for the short PUCCH and the long PUCCH. For example, when an available number of symbols for a long PUCCH is less than a value, X, where X is known to each device, both a UE and a base station may disable long PUCCH intra-slot hopping. The value of X in one example may be 6 symbols, for example. Other numbers may be used for the threshold in other examples, however. When an available number of symbols for long PUCCH is greater than or equal to a value, X, where X is known to each device, both the UE and the base station may enable long PUCCH intra-slot hopping. Similarly, when an available number of symbols for a short PUCCH is less than a value, Y, where Y is known to each device, both a UE and a base station may disable short PUCCH intra-slot hopping. The value of Y in one example may be 1 or 2 symbols, for example. Other numbers may be used for the threshold in other examples, however. When an available number of symbols for a short PUCCH is greater than or equal to a value, Y, where Y is known to each device, both the UE and the base station may enable short PUCCH intra-slot hopping. These values of X and Y may be known at a base station. The base station may make decisions based on the thresholds. The UEs may be instructed to turn frequency hopping on and off, e.g., using RRC signaling. Generally, the UE does not need to know the values of X or Y because the UE does not need to make the threshold determinations.

In a second aspect, signaling may be used to enable or disable variable intra-slot control channel frequency hopping. The signaling may be performed on some predetermined schedule in some examples. In the second aspect, base station-signaling may be used to enable or disable intra-slot long PUCCH hopping. For example, RRC signaling may be used to enable or disable intra-slot long PUCCH hopping. Unlike the first aspect above, signaling is needed in the second aspect. However, the second aspect may allow for changing the threshold used to determine whether to enable or disable intra-slot long PUCCH hopping, unlike the first aspect, which may have a fixed threshold.

In a third aspect, a dynamic signaling (signaling available with a greater frequency as compared to the signaling in the second aspect) may be used to disable or enable intra-slot control channel frequency hopping. For example, in the third aspect, a base station may use dynamic signaling to disable or enable intra-slot long PUCCH hopping. A base station may use DCI to disable or enable intra-slot long PUCCH hopping. Unlike the first aspect above, signaling is needed for the third aspect (e.g., similar to the second aspect). Accordingly, like the second aspect above, using the third aspect, it may be possible to change the threshold used to determine whether to enable or disable intra-slot long PUCCH hopping, unlike the first aspect which may have a fixed threshold. The third aspect may allow for more rapid changes to the threshold as compared to the second aspect discussed above because dynamic signaling may be performed more often or when needed as compared to signaling that may be performed only on a set schedule. The second aspect discussed above, however, may devote fewer bits to transmitting threshold information because the threshold information may be transmitted less often in the second aspect as compared to the third aspect.

Figure 6:
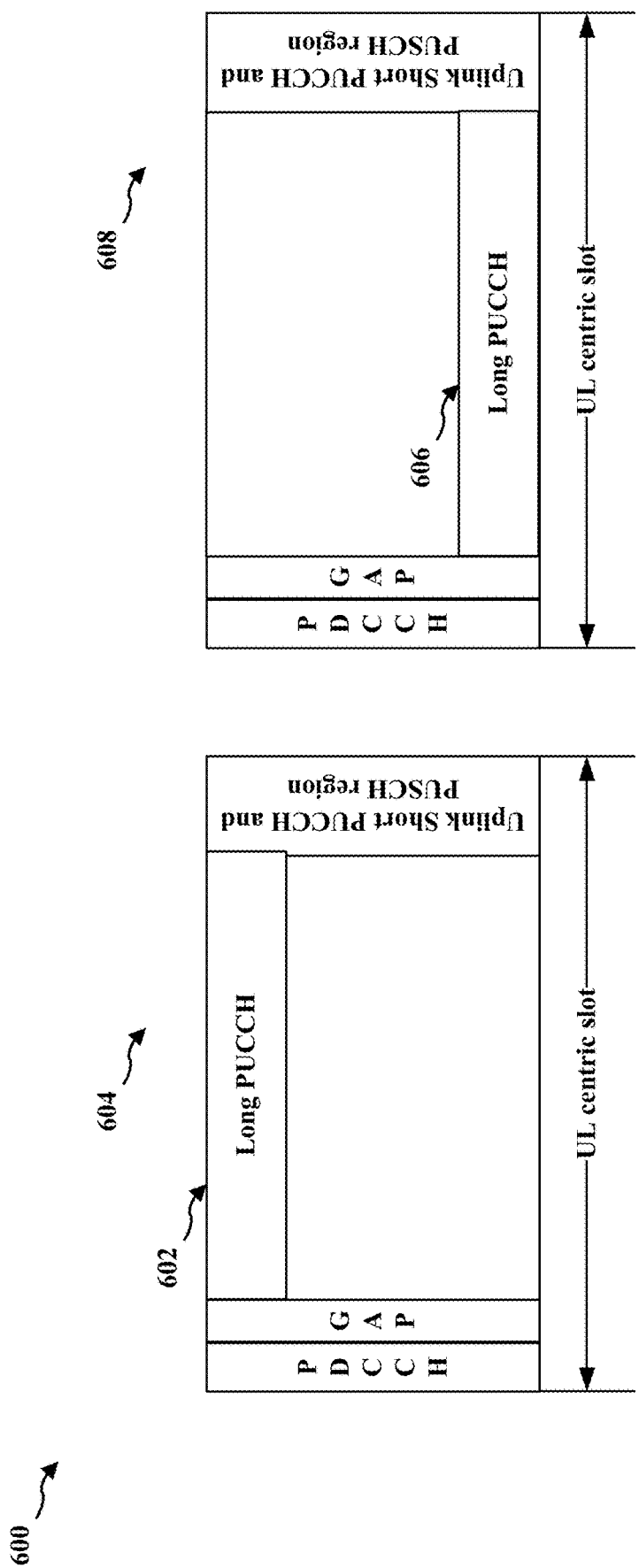
FIG. 6 is a diagram illustrating frequency hopping in slot aggregation.

FIG. 6 is a diagram 600 illustrating frequency hopping in slot aggregation. When inter-slot frequency hopping is enabled with slot aggregation, a UE may transmit a first copy of PUCCH in a first slot on a first set of RBs and a second copy of the PUCCH in a second slot on a second set of RBs where the first set of RBs and the second RBs are different. With slot aggregation multiple time slots may be combined or aggregated so that bursts sent in the aggregated time slots may share training sequence and achieve higher data efficiency through removal of some overhead fields. For example, a long PUCCH 602 in a first uplink centric slot 604 may be located at a first frequency. In the example, of FIG. 6, the first frequency is located at a highest frequency within an uplink long PUCCH and PUSCH region (e.g., the uplink long PUCCH and PUSCH region 506 of FIG. 5). The first frequency may be other frequencies, however. A long PUCCH 606 in a second uplink centric slot 608 may be located at a second frequency. In the example, of FIG. 6, the second frequency is located at a lowest frequency within an uplink long PUCCH and PUSCH region (e.g., the uplink long PUCCH and PUSCH region 506 of FIG. 5). The second frequency may be other frequencies, however.

Intra-slot hopping may include individual PUCCHs hopping between frequencies within a set of frequencies used for the PUCCHs. Inter-slot hopping may include changing sets of frequencies used for PUCCHs hopping, e.g., changing from one set of frequencies to another set of frequencies. A change in a set of frequencies may include changing as few as a single frequency in a set of frequencies to a new frequency used for the PUCCHs up to changing as many as all the frequencies in a set of frequencies to new frequencies used for the PUCCHs. In the illustrated example of FIG. 6, all of the frequencies in a set of frequencies used for the PUCCHs are moved to a new set of frequencies used for PUCCHs.

In the case of slot aggregation, regardless of whether intra-slot hopping may be turned on or off, inter-slot hopping may be turned on or off independently by a base station. With inter-slot hopping, a frequency of a PUCCH may be changed within a subframe across a time slot boundary. For example, referring back to FIG. 4, for inter-slot hopping, the time/frequency blocks 408 may be moved from subframe 0 and split between two subframes, e.g., the latter half of subframe 4 and the first half of subframe 5, such that a frequency of a PUCCH may be changed within a subframe across a time slot boundary, e.g., between the first and second time slots at the border of subframe 4 and subframe 5. For example, inter-slot hopping may be turned on or off independently by a base station. Inter-slot hopping may be turned on or off via RRC signaling or DCI dynamic signaling. For example, in an aspect, a long PUCCH may only have four symbols per slot. In an example with a long PUCCH that only has four symbols per slot, intra-slot hopping may be turned off. When intra-slot hopping is turned off, inter-slot hopping may still be turned on (or off). Inter-slot hopping may be turned on (or off), e.g., by the base station, via RRC signaling or DCI dynamic signaling. For example, an RRC message may use one bit to signal to a UE (or UEs) that intra-slot hopping should be turned on or off. The bit may be high for on and low for off. In another example, the bit may be low for on and high for off. In yet another example, the status of the bit may toggle or not toggle intra-slot hopping on and off. In an example that used DCI dynamic signaling, For example, a DCI message may use one bit to signal to a UE (or UEs) that intra-slot hopping should be turned on or off. The bit may be high for on and low for off. In another example, the bit may be low for on and high for off. In yet another example, the status of the bit may toggle or not toggle intra-slot hopping on and off. Inter-slot hopping may be turned on (or off) to achieve frequency diversity. Other semi-static or dynamic signaling may be used to signal turning on and off intra-slot hopping.

The frequency used to transmit the longer PUCCH may vary. For example, the x-axis in FIG. 6 may be time and the y-axis in FIG. 6 may be frequency. Frequency may increase along the y-axis. For example, the long PUCCH 602 may be at a higher frequency as compared to the long PUCCH 606. For intra-slot hopping, different PUCCHs may change frequency within each long PUCCH 602 and/or a long PUCCH 606. For inter-slot hopping, a set of PUCCH may change frequency. For example, for inter-slot hopping, the long PUCCH may change frequency from the frequencies for the long PUCCH 602 to the frequencies for the long PUCCH 606.

While FIG. 6 illustrates frequency hopping in slot aggregation for an UL centric slot, it will be understood that frequency hopping in slot aggregation may be used in a DL centric slot. For example, frequency hopping in slot aggregation may be used in a DL centric slot such as the DL centric slot 504 illustrated in FIG. 5.

Figure 7:
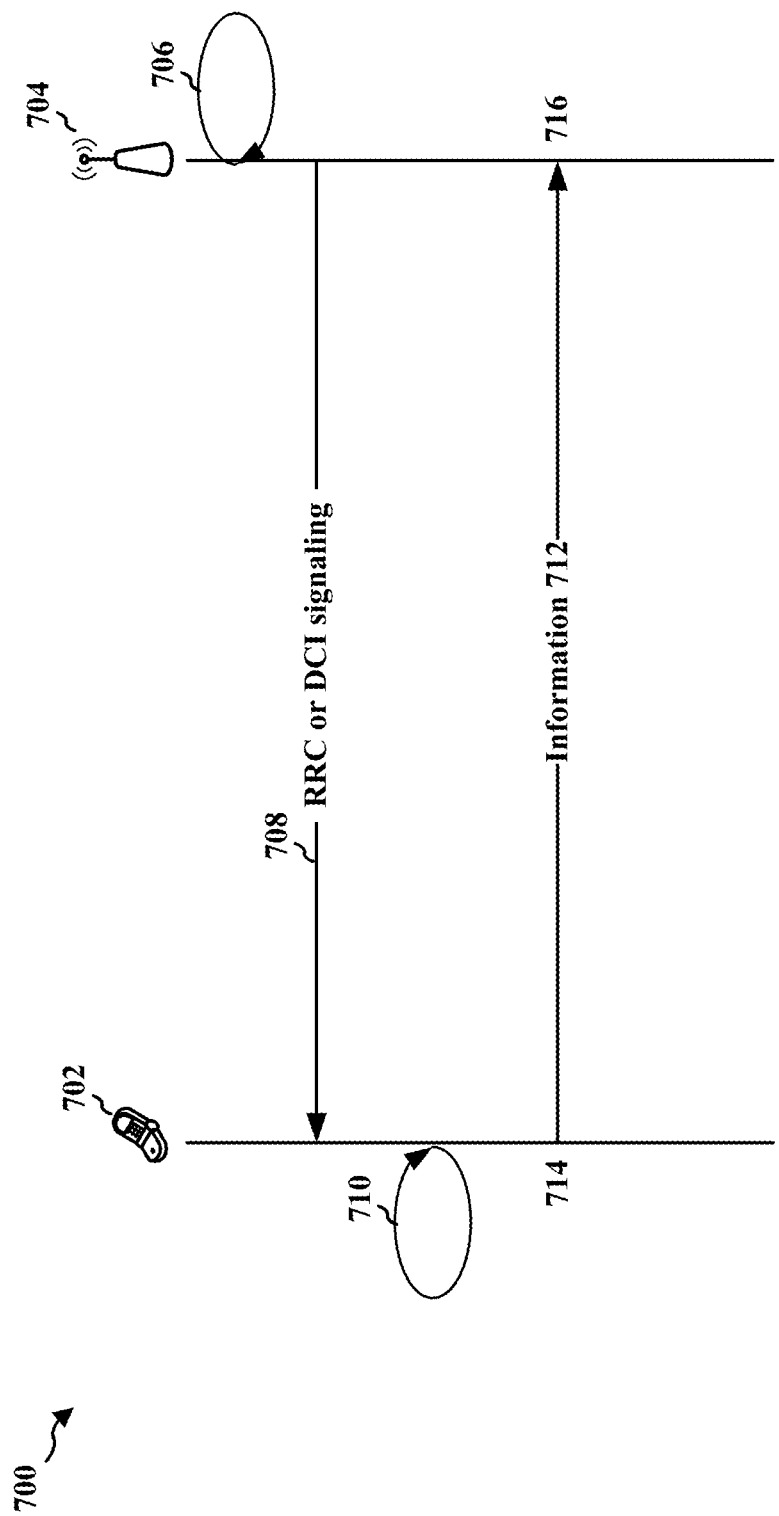
FIG. 7 is a diagram illustrating signal flow for an example of wireless communication system.

FIG. 7 is a diagram 700 illustrating signal flow for an example of wireless communication system. The wireless communication may include a UE 702 and a base station 704. The base station 704 may select 706 one of using or not using inter-slot hopping at the UE 702. Inter-slot hopping is discussed with respect to FIG. 4, below. The arrows 406 are used to illustrated examples of RB's containing PUCCH frequency hopping. In some aspects, long PUCCH may use frequency hopping. For example, FIG. 6 illustrated examples of frequency hopping for long PUCCH 602, 606.

The base station 704 may use one of RRC or DCI signaling 708 to change the state of inter-slot hopping at the UE 702. For example, the base station 704 may use one of RRC or DCI signaling 706 to change from not using inter-slot hopping at the UE 702 to using of inter-slot hopping at the UE 702. The base station 704 may also use one of RRC or DCI signaling 708 to change from using inter-slot hopping at the UE 702 to not using of inter-slot hopping at the UE 702. For example, RRC or DCI signaling 708 may be used to toggle between using and not using inter-slot hopping at the UE 702.

The UE 702 may determine whether or not to use intra-slot frequency hopping for a variable length uplink control channel 710. For example, the UE 702 may determine whether or not to use intra-slot frequency hopping for a variable length uplink control channel 710 based on the RRC or DCI signaling 708.

The UE 702 may communicate information 712 to the transmitter for transmission 714 over the variable length uplink control channel. The information 712 transmitted by the transmitter may be based on the determination of whether or not to use intra-slot frequency hopping.

The base station 704 may receive information 712 from the receiver. The information 712 may be received 716 by the receiver over the variable length uplink control channel based on the determination of whether or not to use intra-slot frequency hopping.

Figure 8:
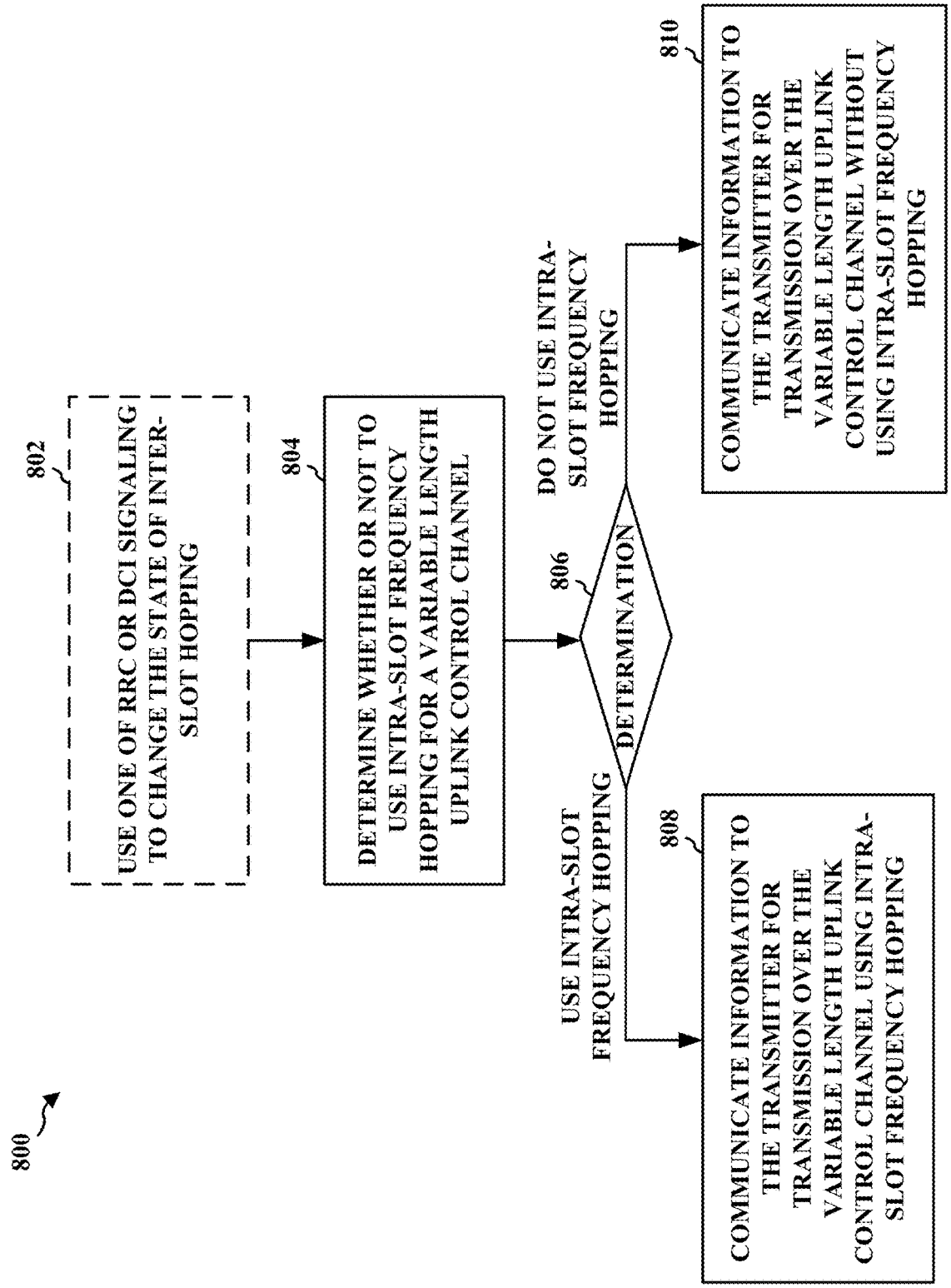
FIG. 8 is a flowchart of a method of wireless communication.

FIG. 8 is a flowchart 800 of a method of wireless communication. The method may be performed by a UE (e.g., the UE 104, 350, 702). At 802, the UE may use one of RRC or DCI signaling to change the state of inter-slot hopping. For example, the UE (e.g., the UE 104, 350, 702) may use one of RRC or DCI signaling to change the state of inter-slot hopping. As discussed above, inter-slot hopping is discussed with respect to FIG. 4, below. The arrows 406 are used to illustrated examples of RB's containing PUCCH frequency hopping. In some aspects, long PUCCH may use frequency hopping. For example, FIG. 6 illustrates examples of frequency hopping for long PUCCH 602, 606. In an aspect, the UE may select between one of RRC signaling and DCI signaling. In an aspect, one of RRC signaling and DCI signaling may be predetermined. In an aspect, the UE 104, 350, 702 change the state of inter-slot hopping.

In an aspect, the UE (e.g., the UE 104, 350, 702) may receive RRC signaling or DCI signaling from a base station (e.g., the base station 102, 180, 310, 704). The signaling may change the state of inter-slot hopping. For example, the signaling may toggle the state of inter-slot hopping between using and not using intra-slot frequency hopping. For example, receiving the signal may cause a toggle between states. In another example, the signaling may set the state of inter-slot hopping at one of using and not using intra-slot frequency hopping. Accordingly, the state may be set by, for example, a state of a transmitted bit or bits within the signaling. Accordingly, a UE 104, 350, 702 may receive a signal (e.g., RRC or DCI signaling) and decode the signal.

At 804, the UE determines whether or not to use intra-slot frequency hopping for a variable length uplink control channel. For example, the UE (e.g., UE 104, 350, 702) may determine whether or not to use intra-slot frequency hopping for a variable length uplink control channel (e.g., Rx Processor 356, Controller/Processor 359, Tx Processor 368). The determination may be based on one of RRC signaling or DCI signaling received. As discussed with respect to 802, the one of RRC signaling or DCI signaling may be used to change the state of inter-slot hopping. Accordingly, a UE 104, 350, 702 may process a decoded signal (e.g., RRC or DCI signaling) and select one of using or not using intra-slot frequency hopping based on receiving the signal.

At 806, the UE makes a decision based on the determination at 804. For example, the UE (e.g., UE 104, 350, 702) makes a decision based on the determination at 804. Accordingly, the UE (e.g., UE 104, 350, 702) may select between 808 and 810 based on the determination at 804. The UE may select a branch of the flowchart based on reading the determination at 804 and selecting how to communicate based on the determination.

At 808, the UE communicates information to the transmitter for transmission over the variable length uplink control channel. The information transmitted by the transmitter may be based on a determination to use intra-slot frequency hopping. For example, the UE (e.g., the UE 104, 350, 702) communicates information to the transmitter (e.g., transmitter 354TX) for transmission over the variable length uplink control channel. The information transmitted by the transmitter (e.g., transmitter 354TX) may be based on the determination to use intra-slot frequency hopping (e.g., 804, 806). For example, hopping may be selected and signals may be transmitted to using hopping.

At 810, the UE communicates information to the transmitter for transmission over the variable length uplink control channel. The information transmitted by the transmitter may be based on the determination not to use intra-slot frequency hopping. For example, the UE (e.g., the UE 104, 350, 702) communicates information to the transmitter (e.g., transmitter 354TX) for transmission over the variable length uplink control channel. The information transmitted by the transmitter (e.g., transmitter 354TX) may be based on the determination o not to use intra-slot frequency hopping (e.g., 804, 806). For example, hopping may not be selected and signals may be transmitted without using hopping.

In an aspect, the variable length uplink control channel includes a long PUCCH.

In an aspect, the transmitter may be configured to transmit the information in a slot on the variable length uplink control channel using a single frequency or intra-slot frequency hopping based on the determination of whether or not to use intra-slot frequency hopping.

In an aspect, determining whether or not to use intra-slot frequency hopping may include determining whether or not to use intra-slot frequency hopping for transmitting data on the variable length uplink control channel based on a duration of the variable length uplink control channel.

In an aspect, the variable length uplink control channel durations using intra-slot frequency hopping and the variable length uplink control channel durations not using intra-slot frequency hopping may be predetermined.

In an aspect, determining whether or not to use intra-slot frequency hopping for the variable length uplink control channel may be based on signaling to enable or disable the variable length uplink control channel hopping.

In an aspect, the signaling may include RRC signaling to enable or disable the variable length uplink control channel hopping.

In an aspect, the signaling may include DCI signaling to enable or disable the variable length uplink control channel hopping.

An aspect may further include using one of Radio Resource Control (RRC) or downlink control information (DCI) signaling to change the state of inter-slot hopping.

Figure 9:
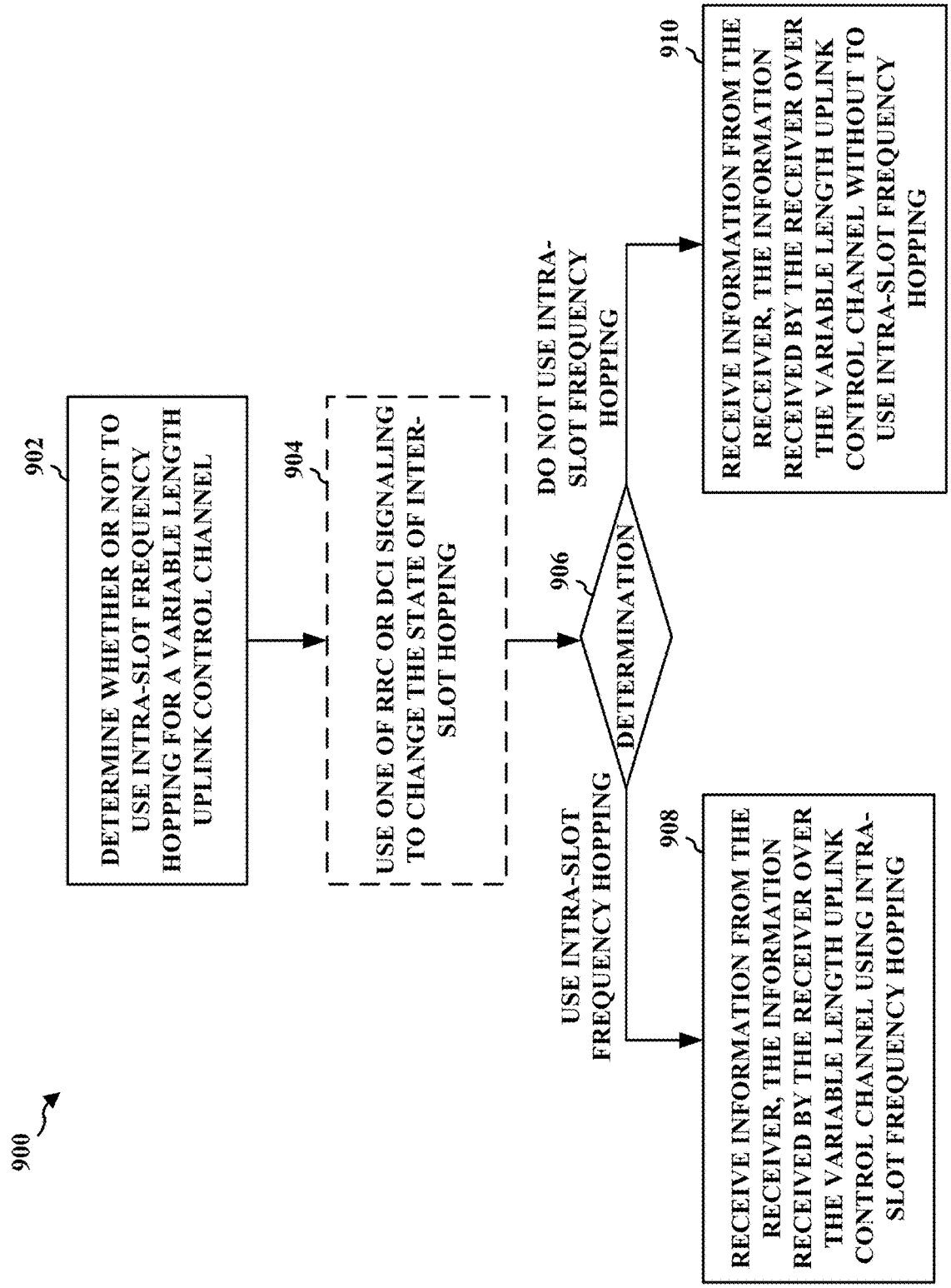
FIG. 9 is a flowchart of a method of wireless communication.

FIG. 9 is a flowchart 900 of a method of wireless communication. The method may be performed by a base station (e.g., the base station 102, 180, 310, 704). At 902, the base station determines whether or not to use intra-slot frequency hopping for a variable length uplink control channel. For example, the base station (e.g., base station 102, 180, 310, 704) determines whether or not to use intra-slot frequency hopping for a variable length uplink control channel (e.g., Rx Processor 370, Controller/Processor 375, Tx Processor 316). For example, the base station may disable intra-slot hopping to decrease DMRS overhead, particularly for shorter durations of the long PUCCH. Alternatively, the base station may enable intra-slot hopping, particularly for longer durations of the long PUCCH. Accordingly, the based station may determine PUCCH duration and select intra-slot hopping or not select intra-slot hopping based on PUCCH duration.

As discussed above, inter-slot hopping is discussed with respect to FIG. 4, below. The arrows 406 are used to illustrated examples of RB's containing PUCCH frequency hopping. In some aspects, long PUCCH may use frequency hopping. For example, FIG. 6 illustrated examples of frequency hopping for long PUCCH 602, 606.

At 904, the base station may use one of RRC signaling or DCI signaling to change the state of inter-slot hopping. For example, the base station (e.g., the base station 102, 180, 310, 704) may use one of RRC signaling or DCI signaling to change the state of inter-slot hopping. In an aspect, the base station (e.g., the base station 102, 180, 310, 704) may transmit RRC signaling or DCI signaling from the base station (e.g., the base station 102, 180, 310, 704) to a UE the UE (e.g., UE 104, 350, 702). The signaling may change the state of inter-slot hopping. For example, the signaling may toggle the state of inter-slot hopping between using and not using intra-slot frequency hopping. For example, receiving the signal may cause a toggle between states. In another example, the signaling may set the state of inter-slot hopping at one of using and not using intra-slot frequency hopping. Accordingly, the state may be set by, for example, a state of a transmitted bit or bits within the signaling. The base station may read the determine state of the inter-slot hopping and signal based on the state.

At 906, the base station makes a decision based on the determination at 804. For example, the base station (e.g., base station 102, 180, 310, 704) makes a decision based on the determination at 804. Accordingly, the base station (e.g., base station 102, 180, 310, 704) may select between 808 and 810 based on the determination at 804. The base station may select a branch of the flowchart based on reading the determination at 902 and selecting how to communicate based on the determination.

At 908, the base station receives information from the receiver. The information may be received by the receiver over the variable length uplink control channel based on the determination use intra-slot frequency hopping. For example, the base station (e.g., base station 102, 180, 310, 704) receives information from the receiver (e.g., receiver 318RX). The information may be received by the receiver (e.g., receiver 318RX) over the variable length uplink control channel based on the determination to use intra-slot frequency hopping. For example, hopping may be selected and signals may be received using hopping.

At 910, the base station receives information from the receiver. The information may be received by the receiver over the variable length uplink control channel based on the determination not to use intra-slot frequency hopping. For example, the base station (e.g., base station 102, 180, 310, 704) receives information from the receiver (e.g., receiver 318RX). The information may be received by the receiver (e.g., receiver 318RX) over the variable length uplink control channel based on the determination not to use intra-slot frequency hopping. For example, hopping may not be selected and signals may be received not using hopping.

In an aspect, the variable length uplink control channel includes a long PUCCH.

In an aspect, the receiver may be configured to receive the information in a slot on the variable length uplink control channel using a single frequency or intra-slot frequency hopping based on the determination of whether or not to use intra-slot frequency hopping.

In an aspect, determining whether or not to use intra-slot frequency hopping may include determining whether or not to use intra-slot frequency hopping for receiving data on the variable length uplink control channel based on a duration of the variable length uplink control channel.

In an aspect, the variable length uplink control channel durations using intra-slot frequency hopping and the variable length uplink control channel durations not using intra-slot frequency hopping may be predetermined.

In an aspect, determining whether or not to use intra-slot frequency hopping for the variable length uplink control channel may be based on signaling to enable or disable the variable length uplink control channel hopping.

In an aspect, the signaling may include RRC signaling to enable or disable the variable length uplink control channel hopping.

In an aspect, the signaling may include DCI signaling to enable or disable the variable length uplink control channel hopping.

An aspect may further include using one of Radio Resource Control (RRC) or downlink control information (DCI) signaling to change the state of inter-slot hopping.

In a UE (e.g., UE 104, 350), the means for determining whether or not to use intra-slot frequency hopping for a variable length uplink control channel may include Rx Processor 356, Controller/Processor 359, Tx Processor 368. The means for communicating information to the transmitter (e.g., transmitter 354TX) for transmission over the variable length uplink control channel, the information transmitted by the transmitter (e.g., transmitter 354TX) based on the determination of whether or not to use intra-slot frequency hopping may include Rx Processor 356, Controller/Processor 359, Tx Processor 368. The transmitter 354TX and the antenna 352 may be used to transmit the communication information.

In a base station (e.g., base station 102, 180, 310), the means for determining whether or not to use intra-slot frequency hopping for a variable length uplink control channel may include Rx Processor 370, Controller/Processor 375, Tx Processor 316. The means for receiving information from the receiver (e.g., receiver 318RX) may include Rx Processor 370, Controller/Processor 375, Tx Processor 316. The information may be received by the receiver (e.g., receiver 318RX) over the variable length uplink control channel based on the determination of whether or not to use intra-slot frequency hopping. The information may be received by the receiver 318RX and the antenna 320.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 10:
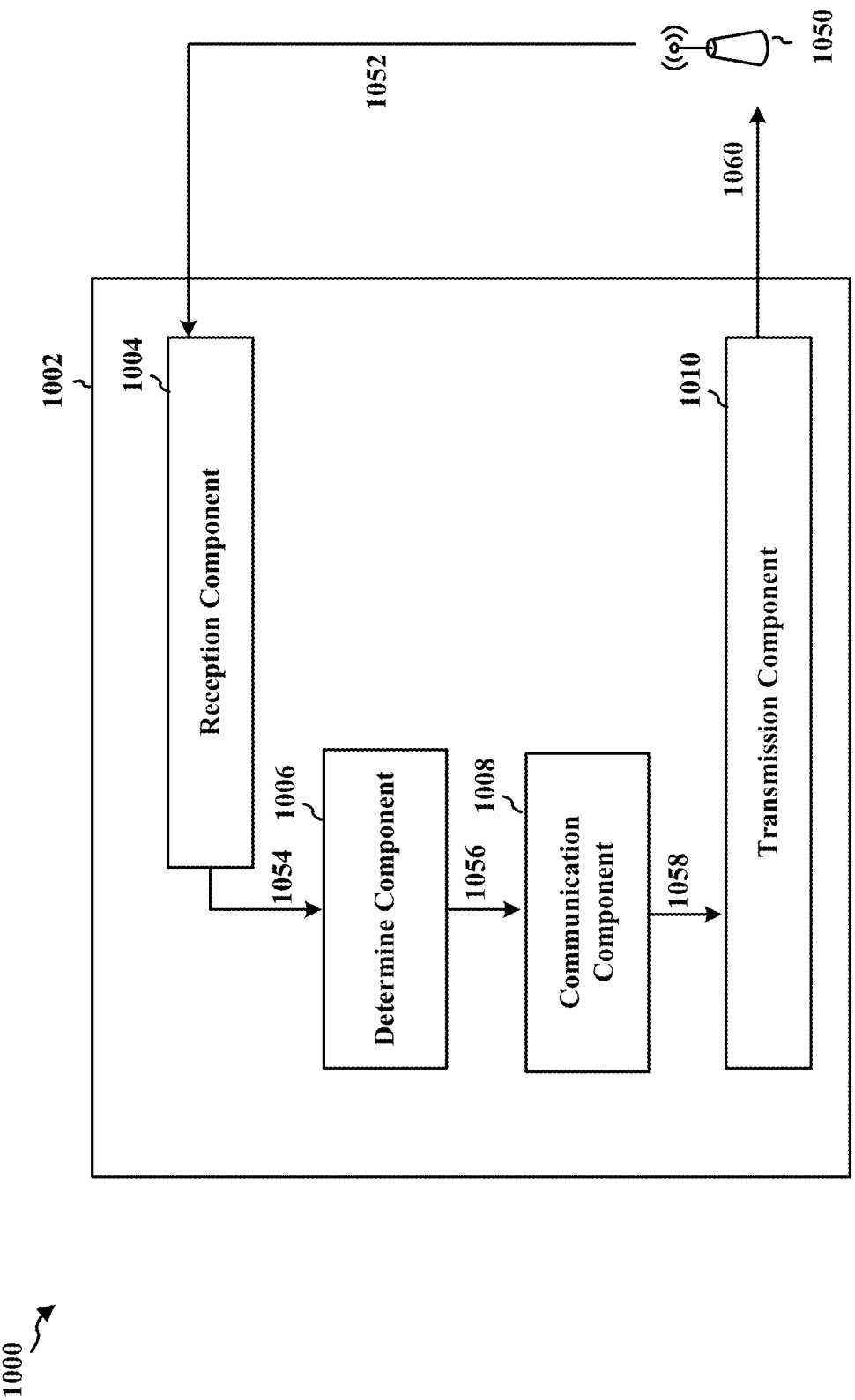
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a UE 104, 350, 702. The apparatus includes a reception component 1004 that receives signals 1052 from the base station 1050, a determination component 1006 that determines whether or not to use intra-slot frequency hopping for a variable length uplink control channel based on signals 1054 from the reception component 1004 and outputs a signal 1056 indicating the determination, and a communication component 1008 that communicates information 1058 to the transmitter for transmission over the variable length uplink control channel using intra-slot frequency hopping or not using intra-slot frequency hopping based on the determination, e.g., over transmission 1060.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
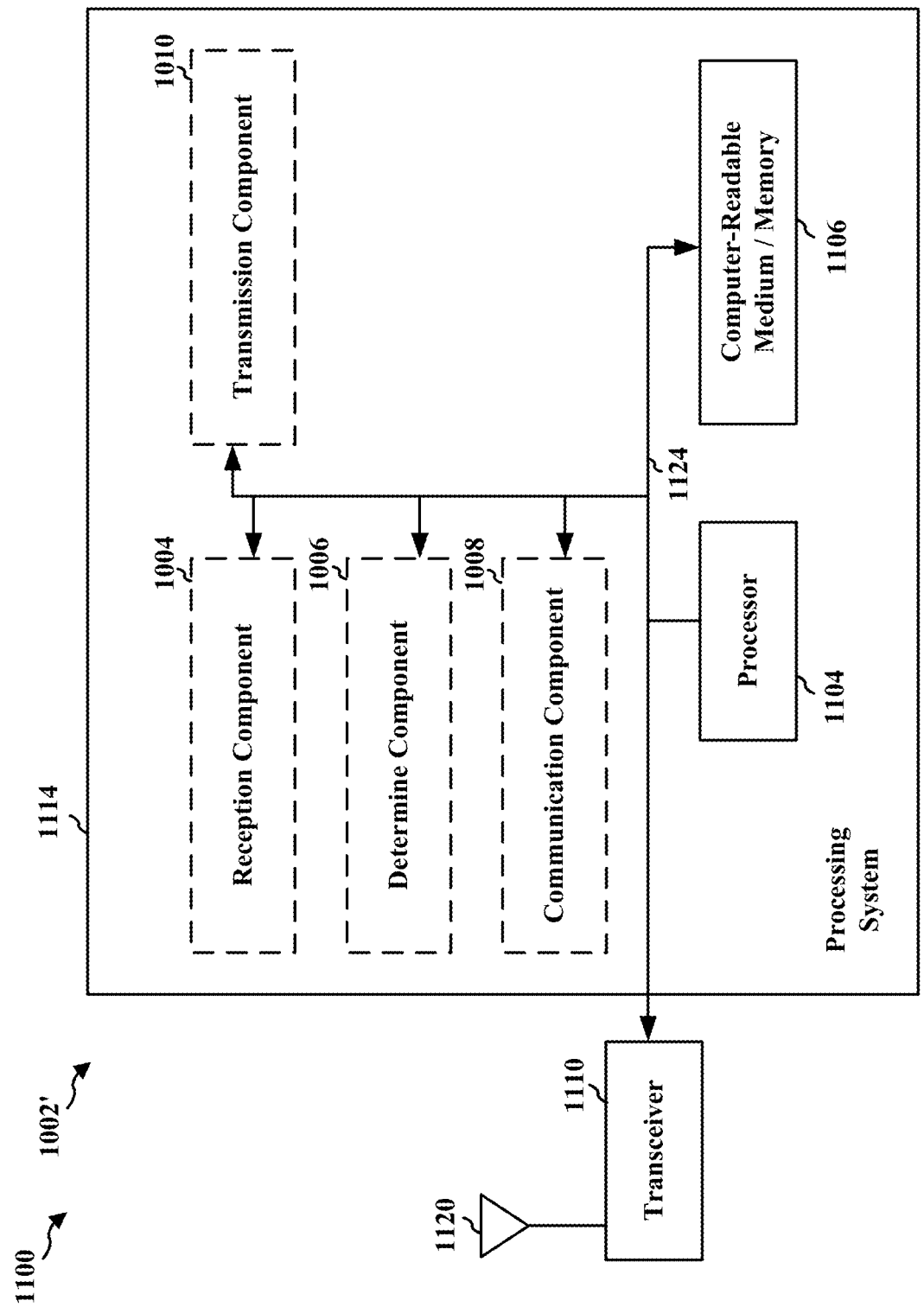
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010 and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for determining whether or not to use intra-slot frequency hopping for a variable length uplink control channel, means for communicating information to the transmitter for transmission over the variable length uplink control channel, the information transmitted by the transmitter based on the determination of whether or not to use intra-slot frequency hopping, means for using one of RRC or DCI signaling to change the state of inter-slot hopping. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
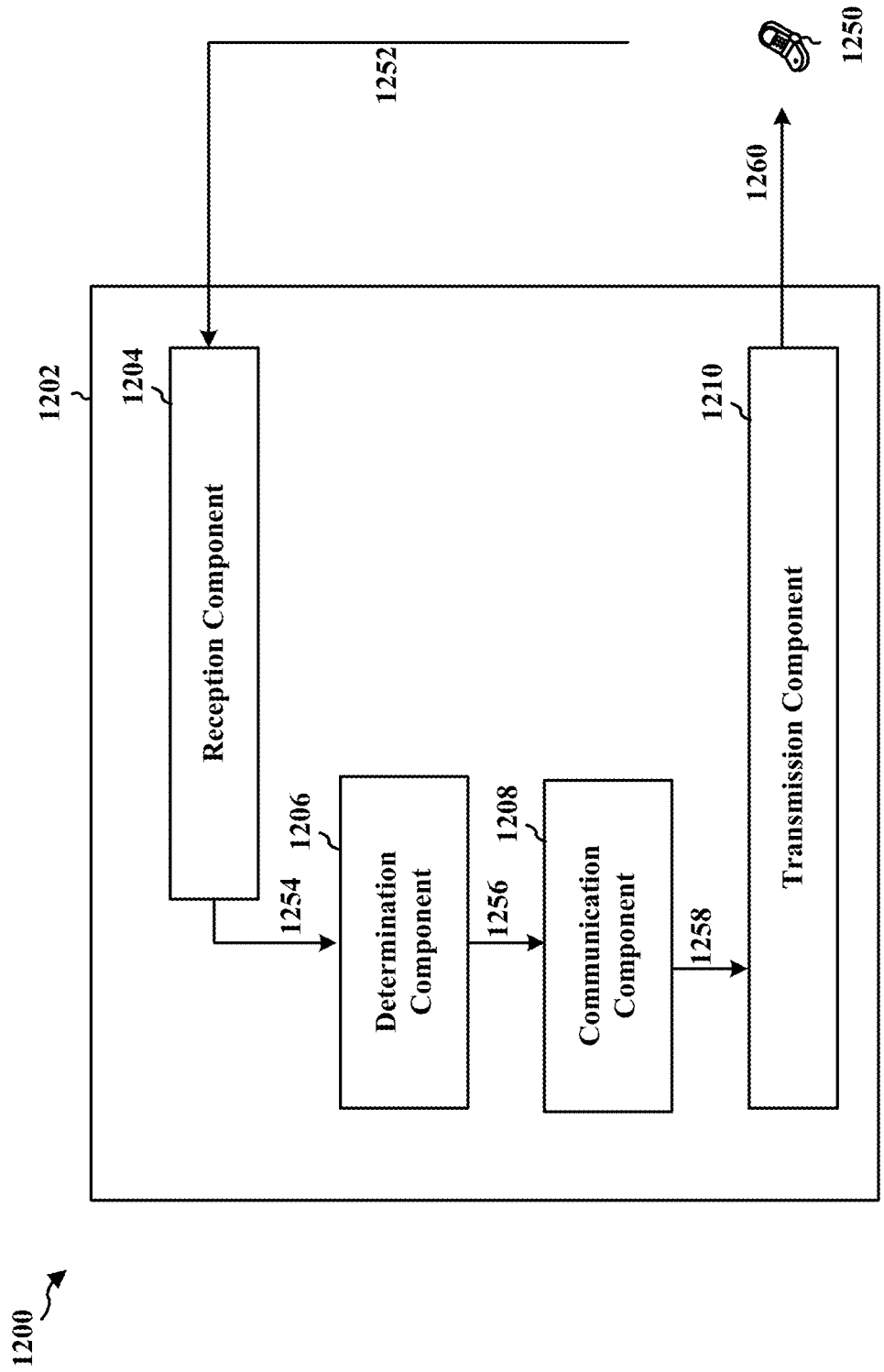
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station 102, 180, 310, 704. The apparatus includes a reception component 1204 that receives signals 1252 from a UE 1250, a determination component 1206 that determines whether or not to use intra-slot frequency hopping for a variable length uplink control channel based on signals 1254 from the reception component or other signals (not shown) that may indicate a need to decrease, for example, for shorter durations of the long PUCCH, a communication component that may communicate 1258 the determination 1256 to a communication component 1208 that may control a transmit component 1210 that transmits signals 1260, e.g., one of RRC or DCI signaling, to a UE 1250 to change the state of inter-slot hopping.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
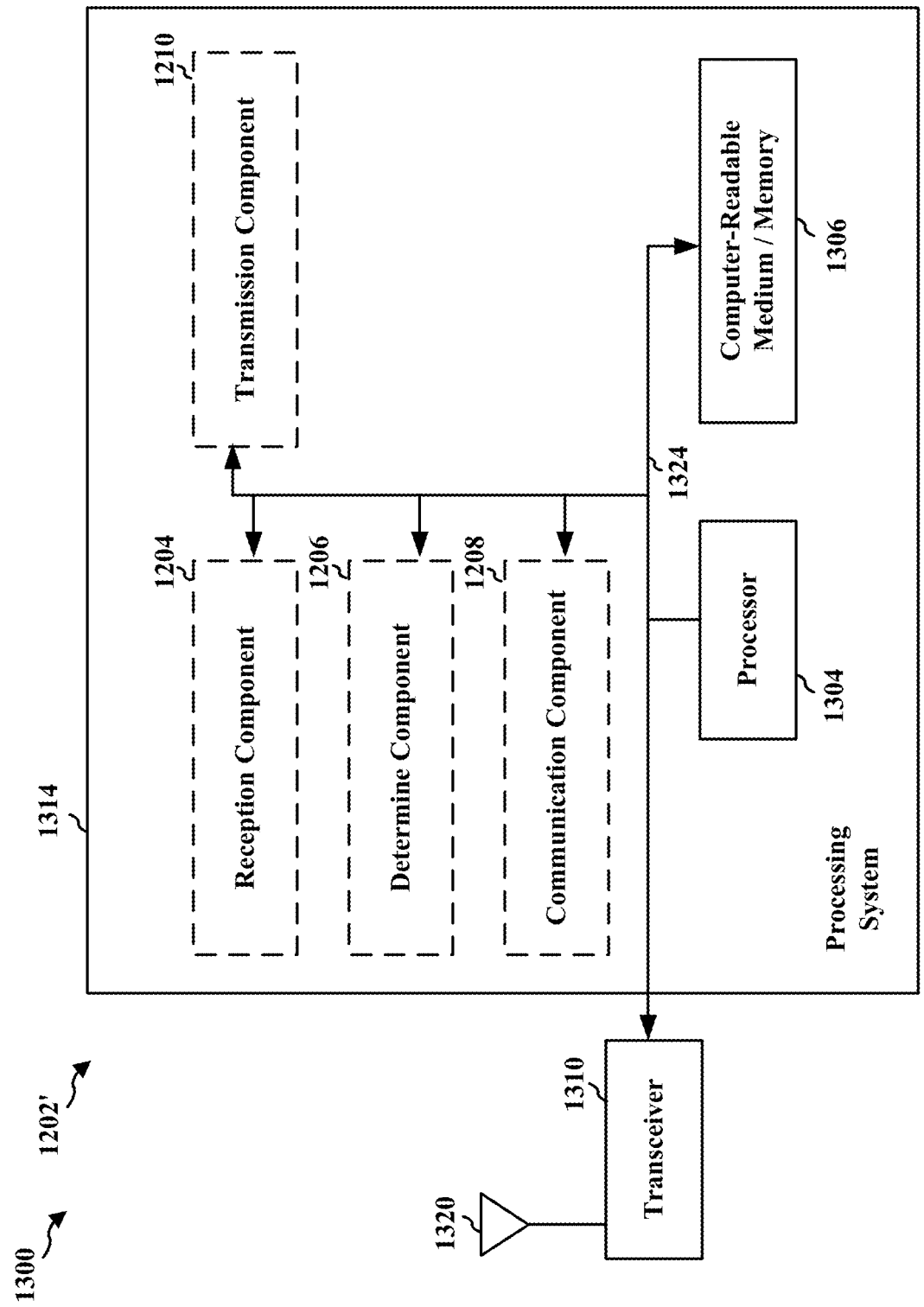
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for determining whether or not to use intra-slot frequency hopping for a variable length uplink control channel, means for receiving information from the receiver. The information received by the receiver may be received over the variable length uplink control channel based on the determination of whether or not to use intra-slot frequency hopping, and means for using one of RRC or DCI signaling to change the state of inter-slot hopping. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
a transmitter; and
a processing system configured to:
   determine whether or not to use intra-slot frequency hopping for a variable length uplink control channel, and
   communicate information to the transmitter for transmission in a slot over the variable length uplink control channel using a single frequency or intra-slot frequency hopping based on the determination of whether or not to use intra-slot frequency hopping, wherein a number of demodulation reference signals (DMRSs) on the variable length uplink control channel is reduced when the intra-slot frequency hopping is not used relative to when the intra-slot frequency hopping is used.

2. The apparatus of claim 1, wherein the variable length uplink control channel comprises a long physical uplink control channel (PUCCH).

3. The apparatus of claim 1, wherein the variable length uplink control channel comprises a short physical uplink control channel (PUCCH).

4. The apparatus of claim 1, wherein to determine whether or not to use intra-slot frequency hopping, the processing system is configured to determine whether or not to use intra-slot frequency hopping for transmitting data on the variable length uplink control channel based on a duration of the variable length uplink control channel.

5. The apparatus of claim 4, wherein variable length uplink control channel durations using intra-slot frequency hopping and the variable length uplink control channel durations not using intra-slot frequency hopping are predetermined.

6. The apparatus of claim 1, wherein the processing system is configured to determine whether or not to use intra-slot frequency hopping for the variable length uplink control channel based on received signaling to enable or disable the variable length uplink control channel hopping.

7. The apparatus of claim 6, wherein the signaling comprises Radio Resource Control (RRC) signaling to enable or disable the variable length uplink control channel hopping or the signaling comprises downlink control information (DCI) signaling to enable or disable the variable length uplink control channel hopping.

8. The apparatus of claim 1, wherein the processing system is further configured to use one of received Radio Resource Control (RRC) signaling or received downlink control information (DCI) signaling to change a state of inter-slot hopping.

9. An apparatus for wireless communication, comprising:
a receiver configured to receive information over a variable length uplink control channel; and
a processing system configured to:
determine whether or not to use intra-slot frequency hopping for the variable length uplink control channel, and
receive the information from the receiver in a slot on the variable length uplink control channel using a single frequency or intra-slot frequency hopping based on the determination of whether or not to use intra-slot frequency hopping, wherein a number of demodulation reference signals (DMRSs) on the variable length uplink control channel is reduced when the intra-slot frequency hopping is not used relative to when the intra-slot frequency hopping is used.

10. The apparatus of claim 9, wherein the variable length uplink control channel comprises a long physical uplink control channel (PUCCH).

11. The apparatus of claim 9, wherein the variable length uplink control channel comprises a short physical uplink control channel (PUCCH).

12. The apparatus of claim 9, wherein to determine whether or not to use intra-slot frequency hopping, the processing system is configured to determine whether or not to use intra-slot frequency hopping for receiving data on the variable length uplink control channel based on a duration of the variable length uplink control channel.

13. The apparatus of claim 12, wherein variable length uplink control channel durations using intra-slot frequency hopping and the variable length uplink control channel durations not using intra-slot frequency hopping are predetermined.

14. The apparatus of claim 12, wherein the processing system is further configured to signal a user equipment (UE) to enable or disable the variable length uplink control channel hopping.

15. The apparatus of claim 14, wherein the signaling comprises Radio Resource Control (RRC) signaling to enable or disable the variable length uplink control channel hopping or the signaling comprises downlink control information (DCI) signaling to enable or disable the variable length uplink control channel hopping.

16. The apparatus of claim 12, wherein the processing system is further configured to use one of Radio Resource Control (RRC) or downlink control information (DCI) signaling to change a state of inter-slot hopping.

17. A method of wireless communication, comprising:
determining whether or not to use intra-slot frequency hopping for a variable length uplink control channel, and
communicating information to a transmitter for transmission in a slot over the variable length uplink control channel using a single frequency or intra-slot frequency hopping based on the determination of whether or not to use intra-slot frequency hopping, wherein a number of demodulation reference signals (DMRSs) on the variable length uplink control channel is reduced when the intra-slot frequency hopping is not used relative to when the intra-slot frequency hopping is used.

18. The method of claim 17, wherein the variable length uplink control channel comprises a long physical uplink control channel (PUCCH).

19. The method of claim 17, wherein the variable length uplink control channel comprises a short physical uplink control channel (PUCCH).

20. The method of claim 17, wherein the determining whether or not to use intra-slot frequency hopping comprises determining whether or not to use intra-slot frequency hopping for transmitting data on the variable length uplink control channel based on a duration of the variable length uplink control channel.

21. The method of claim 20, wherein variable length uplink control channel durations using intra-slot frequency hopping and the variable length uplink control channel durations not using intra-slot frequency hopping are predetermined.

22. The method of claim 17, wherein the determining whether or not to use intra-slot frequency hopping for the variable length uplink control channel is based on received signaling to enable or disable the variable length uplink control channel hopping.

23. The method of claim 22, wherein the signaling comprises at least one of Radio Resource Control (RRC) signaling to enable or disable the variable length uplink control channel hopping or downlink control information (DCI) signaling to enable or disable the variable length uplink control channel hopping.

24. The method of claim 17, further comprising using one of received Radio Resource Control (RRC) signaling or received downlink control information (DCI) signaling to change a state of inter-slot hopping.

25. A method of wireless communication, comprising:
determining whether or not to use intra-slot frequency hopping for a variable length uplink control channel, and
receiving information in a slot over the variable length uplink control channel using a single frequency or intra-slot frequency hopping based on the determination of whether or not to use intra-slot frequency hopping, wherein a number of demodulation reference signals (DMRSs) on the variable length uplink control channel is reduced when the intra-slot frequency hopping is not used relative to when the intra-slot frequency hopping is used.

26. The method of claim 25, wherein the variable length uplink control channel comprises a long physical uplink control channel (PUCCH).

27. The method of claim 25, wherein the variable length uplink control channel comprises a short physical uplink control channel (PUCCH).

28. The method of claim 25, wherein the determining whether or not to use intra-slot frequency hopping comprises determining whether or not to use intra-slot frequency hopping for receiving data on the variable length uplink control channel based on a duration of the variable length uplink control channel.

29. The method of claim 28, wherein variable length uplink control channel durations using intra-slot frequency hopping and the variable length uplink control channel durations not using intra-slot frequency hopping are predetermined.

30. The method of claim 28, further comprising signaling a user equipment (UE) to enable or disable the variable length uplink control channel hopping.

31. The method of claim 30, wherein the signaling comprises at least one of Radio Resource Control (RRC) signaling to enable or disable the variable length uplink control channel hopping or downlink control information (DCI) signaling to enable or disable the variable length uplink control channel hopping.

32. The method of claim 25, further comprising using one of Radio Resource Control (RRC) or downlink control information (DCI) signaling to change a state of inter-slot hopping.

33. An apparatus for wireless communication, comprising:
   means for determining whether or not to use intra-slot frequency hopping for a variable length uplink control channel, and
   means for communicating information to a transmitter for transmission in a slot over the variable length uplink control channel using a single frequency or intra-slot frequency hopping based on the determination of whether or not to use intra-slot frequency hopping, wherein a number of demodulation reference signals (DMRSs) on the variable length uplink control channel is reduced when the intra-slot frequency hopping is not used relative to when the intra-slot frequency hopping is used.

34. The apparatus of claim 33, wherein the variable length uplink control channel comprises a long physical uplink control channel (PUCCH).

35. The apparatus of claim 33, wherein the variable length uplink control channel comprises a short physical uplink control channel (PUCCH).

36. The apparatus of claim 33, wherein the means for determining whether or not to use intra-slot frequency hopping is configured to determine whether or not to use intra-slot frequency hopping for transmitting data on the variable length uplink control channel based on a duration of the variable length uplink control channel.

37. The apparatus of claim 36, wherein variable length uplink control channel durations using intra-slot frequency hopping and the variable length uplink control channel durations not using intra-slot frequency hopping are predetermined.

38. The apparatus of claim 33, wherein the means for determining whether or not to use intra-slot frequency hopping for the variable length uplink control channel is configured to determine whether or not to use intra-slot frequency hopping for the variable length uplink control channel based on received signaling to enable or disable the variable length uplink control channel hopping.

39. The apparatus of claim 38, wherein the signaling comprises Radio Resource Control (RRC) signaling to enable or disable the variable length uplink control channel hopping or the signaling comprises downlink control information (DCI) signaling to enable or disable the variable length uplink control channel hopping.

40. The apparatus of claim 33, further comprising:
   means for using one of received Radio Resource Control (RRC) signaling or received downlink control information (DCI) signaling to change a state of inter-slot hopping.

41. An apparatus for wireless communication, comprising:
   means for determining whether or not to use intra-slot frequency hopping for a variable length uplink control channel, and
   means for receiving information in a slot over the variable length uplink control channel using a single frequency or intra-slot frequency hopping based on the determination of whether or not to use intra-slot frequency hopping, wherein a number of demodulation reference signals (DMRSs) on the variable length uplink control channel is reduced when the intra-slot frequency hopping is not used relative to when the intra-slot frequency hopping is used.

42. The apparatus of claim 41, wherein the variable length uplink control channel comprises a long physical uplink control channel (PUCCH).

43. The apparatus of claim 41, wherein the variable length uplink control channel comprises a short physical uplink control channel (PUCCH).

44. The apparatus of claim 41, wherein the means for determining whether or not to use intra-slot frequency hopping is configured to determine whether or not to use intra-slot frequency hopping for receiving data on the variable length uplink control channel based on a duration of the variable length uplink control channel.

45. The apparatus of claim 44, wherein variable length uplink control channel durations using intra-slot frequency hopping and the variable length uplink control channel durations not using intra-slot frequency hopping are predetermined.

46. The apparatus of claim 44, further comprising:
   means for signaling a user equipment (UE) to enable or disable the variable length uplink control channel hopping.

47. The apparatus of claim 46, wherein the signaling comprises Radio Resource Control (RRC) signaling to enable or disable the variable length uplink control channel hopping or the signaling comprises downlink control information (DCI) signaling to enable or disable the variable length uplink control channel hopping.

48. The apparatus of claim 44, further comprising means for using one of Radio Resource Control (RRC) or downlink control information (DCI) signaling to change a state of inter-slot hopping.

* * * * *